United States Patent [19]

Watson et al.

[11] Patent Number: 4,654,514
[45] Date of Patent: Mar. 31, 1987

[54] PRODUCT INFORMATION SYSTEM USING HAND-HELD UNIT WITH CODE READER

[75] Inventors: Milton R. Watson; F. G. Seeberger, Jr., both of Round Rock; Robert M. Lockerd, Dallas, all of Tex.

[73] Assignee: Texas Instruments Incorporated, Dallas, Tex.

[21] Appl. No.: 649,097

[22] Filed: Sep. 10, 1984

[51] Int. Cl.$^4$ .............................................. G06F 15/24
[52] U.S. Cl. ................................ 235/385; 235/383; 235/462; 235/472
[58] Field of Search ............... 235/381, 383, 385, 472; 340/825.35

[56] References Cited

U.S. PATENT DOCUMENTS

| | | | |
|---|---|---|---|
| 4,415,065 | 11/1983 | Sandstedt | 235/383 X |
| 4,423,319 | 12/1983 | Jacobsen | 235/381 X |
| 4,500,880 | 2/1985 | Gomersall et al. | 235/385 X |
| 4,521,677 | 6/1985 | Sarwin | 235/383 X |

Primary Examiner—David L. Trafton
Attorney, Agent, or Firm—James T. Comfort; Melvin Sharp; Gary C. Honeycutt

[57] ABSTRACT

Individual display modules are located along a shelf containing items for sale. The display modules are loaded via a hand-held unit with data pertaining to the items. This data has previously been downloaded from a host computer into the hand-held unit. In order to minimize human error, the hand-held unit contains a reader for reading a code from either the item or the shelf upon which the item is located. This code is then used by the hand-held unit in order to determine what data is to be downloaded into the appropriate display module. The coupling between the hand-held unit and the display modules may be of the type requiring a direct electrical connection or the close-proximity type employing optical or electro-magnetic coupling.

15 Claims, 4 Drawing Figures

PRODUCT INFORMATION SYSTEM USING HAND-HELD UNIT WITH CODE READER

BACKGROUND AND SUMMARY

In many retail environments (in particular a grocery store), items for sale are displayed along a shelf. Information about the various items are usually listed along the shelf holding the item. Frequently changes in the information is required. This is normally done by having new labels with the new information printed and placed along the shelf. Having new labels printed takes a substantial period of time, usually on the order of three days to two weeks. In many cases, this time lag is a major problem to the retailer. The retailer cannot adequately reflect rapidly fluctuating prices or other information about a given product. The retailer must either take a loss on some items (as in the case of the price going up), or the customer may experience frustration in paying more for a product that he should (if the price goes down).

It is an object of the invention to reduce the time period needed to change information shown to a customer about an item.

Cost of the printed labels is an overhead cost that the retail store must absorb. While the cost of the labels is not very expensive on an individual basis, there is a recurring cost of having to frequently get new labels printed. Further, as many of the labels are unique to the item, the cost per label must necessarily be higher than if all labels were the same.

It is another object of the invention to reduce the recurring costs associated with reprinting labels.

Another problem that is associated with conventional labels is that of human error. When labels arrive from the printer, they must be hand-placed on the shelf associated with the item whose information has been changed. The label may be printed incorrectly, in which case the label must be reprinted thus introducing a further time lag. Worse yet, the label may be put on the wrong item leading to confusion about the information on two items for sale.

It is another object of the invention to reduce the human error factor.

What is disclosed is a replacement for the labeling system that allows for frequent changes without the need to reprint labels. The labels are replaced by small display modules. These display modules may be powered by an electrical storage device or have power fed to them via a connector. A multi-digit display is integral to the module. Also present is a coupler to interface to a hand-held unit so that pricing or other information may be programmed into the display module for display to the ultimate consumer.

The hand-held unit contains a memory for storing information about a large number of items. A code reader is included in the hand-held unit for reading a code off of the products for sale, or in some instances, off of the shelf. Also present in the hand-held unit is a coupler for programming the display modules with the information and an input port for initially receiving the data from another source.

The above objects are achieved by a product information display system comprising shelf means, product located along said shelf, indicia for uniquely identifying said product, visual display means for displaying product information, and update means for modifying said product information; said visual display means being placed along said shelf means; said visual display means including visual display indicia, a control means, and a first coupler means; said control means controlling said visual display indicia in response to data received by said first coupler means; said update means comprising a hand-held unit and reader means for reading said indicia uniquely identifying said product; and said hand-held unit further including a second coupler means for transmitting data to said first coupler means wherein said data is correlated with said indicia uniquely identifying said product.

DETAILED DESCRIPTION OF THE INVENTION

Figure 1:
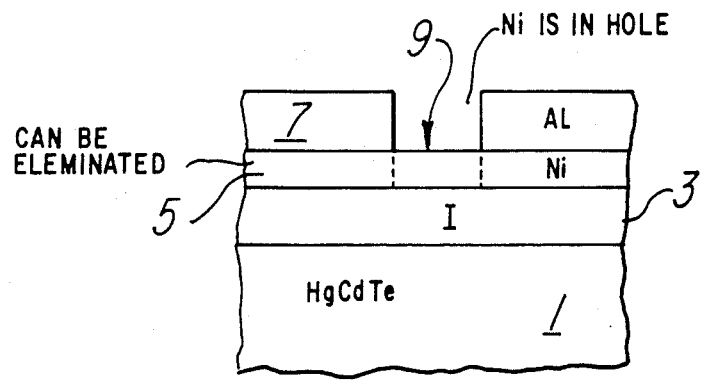
FIG. 1 illustrates a preferred physical embodiment of the display module.
Figure 3:
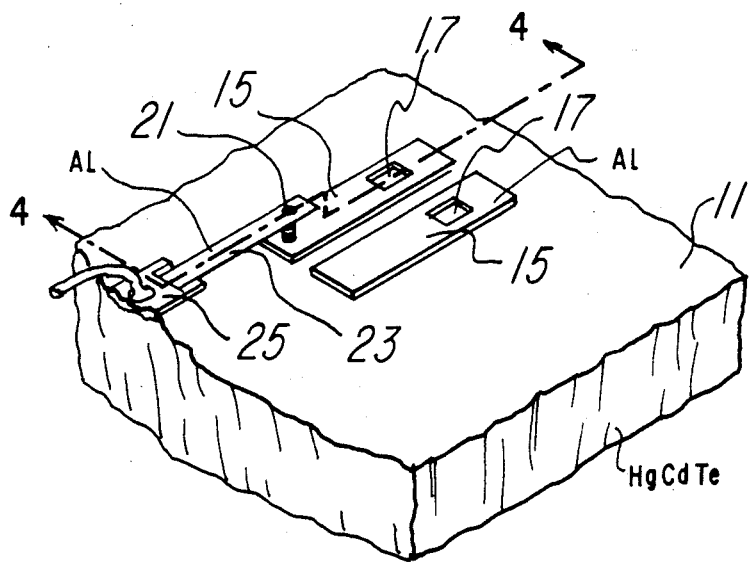
FIG. 3 is a block diagram of the electronic circuitry as used in the display module.

In FIG. 1, one version of a display module (1) is shown. The module consists of a case (4), a visual display (3), and a coupling element (2). Also contained in the module (1) is some electronic circuitry as shown in FIG. 3. The display module is positioned along a shelf in a retail store. Preferably the placement bears a close relationship with the item about which information is to be displayed. Power for the display module (1) may be derived from power conductors positioned along the shelf, a battery, or from solar cells placed on the case (4).

Figure 2:
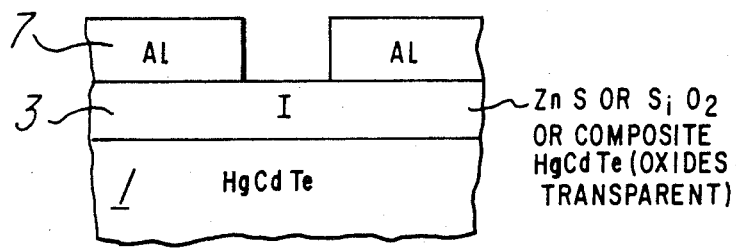
FIG. 2 illustrates a preferred physical embodiment of the hand-held unit.

FIG. 2 shows the preferred embodiment of the hand-held unit (5). The unit (5) consists of a case (7), a visual display (8), and a coupler element (6). Attached via coiled cord (20) is the code reader (21). Also included in the hand-held unit (5) is the electronic circuitry shown in FIG. 4.

A block diagram of the electronic circuitry used in the presently preferred embodiment of the individual display modules is shown in FIG. 3. A micro-processor (13) such as the TMS7000 manufactured by Texas Instruments Incorporated of Dallas, Tex. is used to control the data input from the coupler element (2) and to pass display data to the display (3). It should be noted that the micro-processor is not critical to the invention. Indeed, those skilled in the art may design circuitry out of discrete logic to perform similar control operations. The program memory (15) is used to store the control program for the micro-processor (13). Data memory (14) is used to store information provided by the hand-held unit (5). The data memory (14) may also be used to store an address code that is unique to each display module.

The coupler elements (2 and 6) may be of several different types. Obviously, the coupler elements (2 and 6) must be compatible so that data transfer may take place. In one embodiment the coupler element (6) may partly consist of a light emitting source (such as an LED). The corresponding coupler element (2) may then partly consist of a light sensitive element (such as a photo-diode). An alternative embodiment may use radio frequency transmission means and radio frequency reception means for the coupler elements (6)

and (2) respectively. Another alternative embodiment may use a jack and plug arrangement. The first two embodiments discussed above are of the close-proximity type wherein the hand-held unit (5) must be held such that the coupler element (6) is near the coupler element (2) of the display module (1). The last alternative embodiment discussed is of the type wherein a direct electrical contact is established between coupler element (2) and coupler element (6). Other arrangements are of course possible and no limitation on the invention is herein implied.

The visible display indicia (3) and (8) are of the LCD type in the preferred embodiments. Alternatively, they may be LEDs or any other type of electronically controlled display means. The number of digits displayed is not critical to the invention. In the preferred embodiment of the display module (1), the number of digits is four with a decimal point. This allows the display module (1) to show to a consumer the price of an item ranging up to $99.99. In the preferred embodiment of the hand-held unit (5), the number of digits is 6 with a controllable decimal point. This allows the user of the unit (5) to input an address code or to verify the data received by the display module (1) as will be discussed later.

Figure 4:
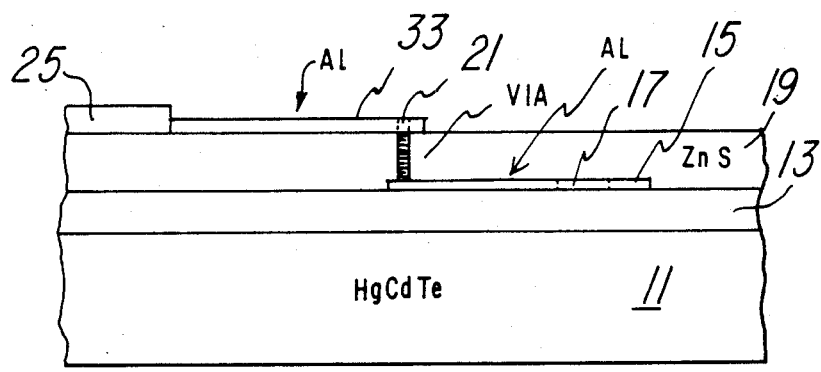
FIG. 4 is a block diagram of the electronic circuitry as used in the hand-held unit.
Figure 5:
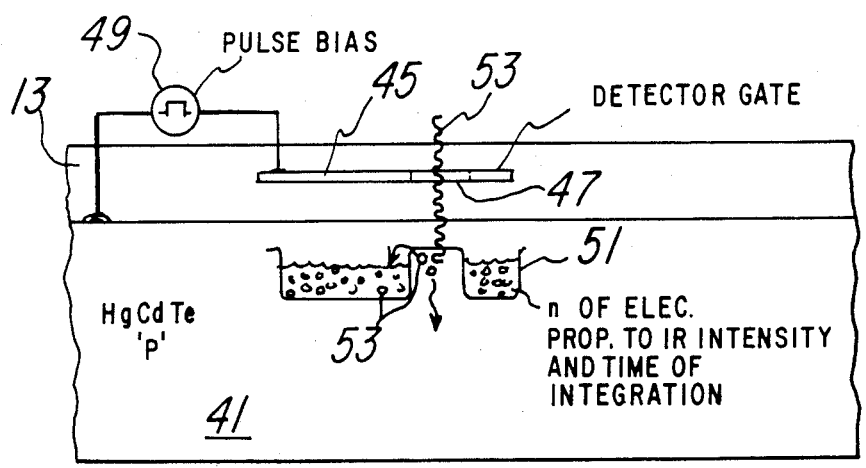
Figure 1:
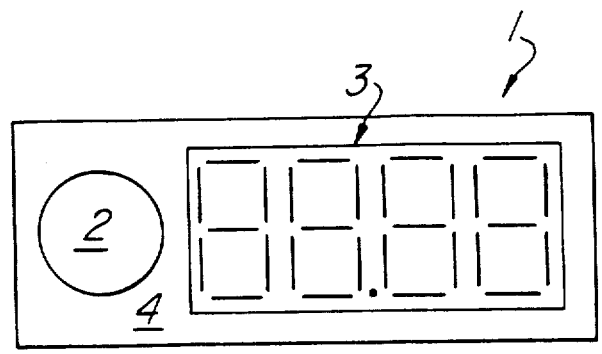
Figure 2:
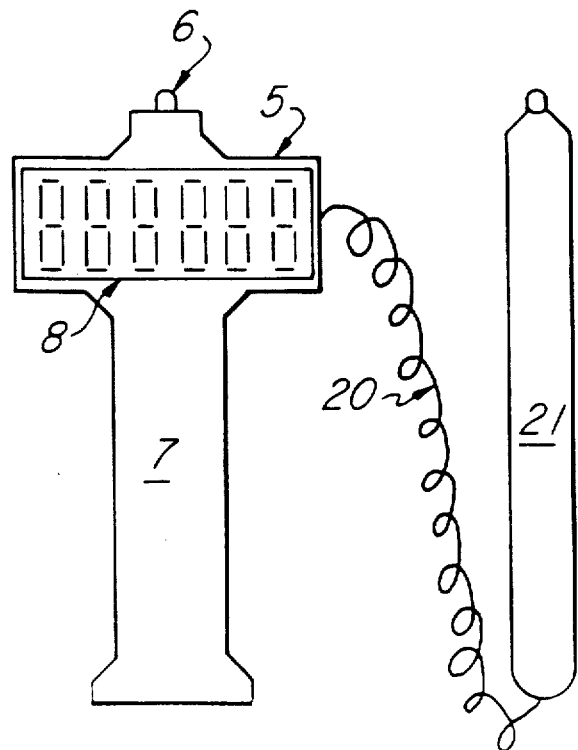
Figure 3:
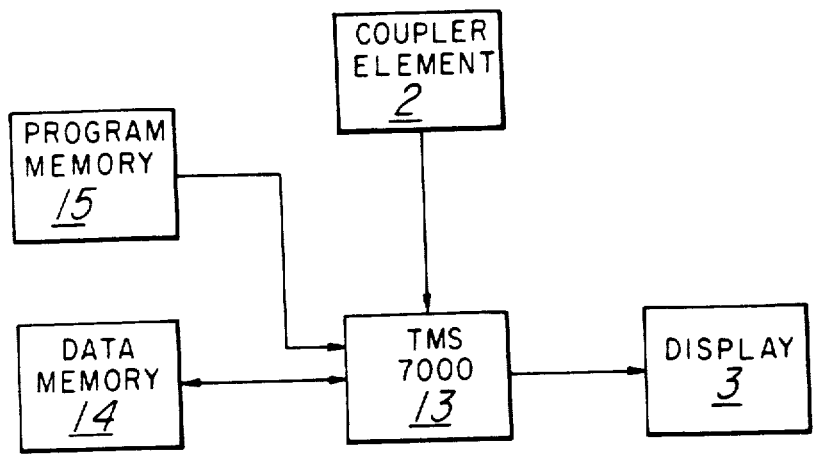
Figure 4:
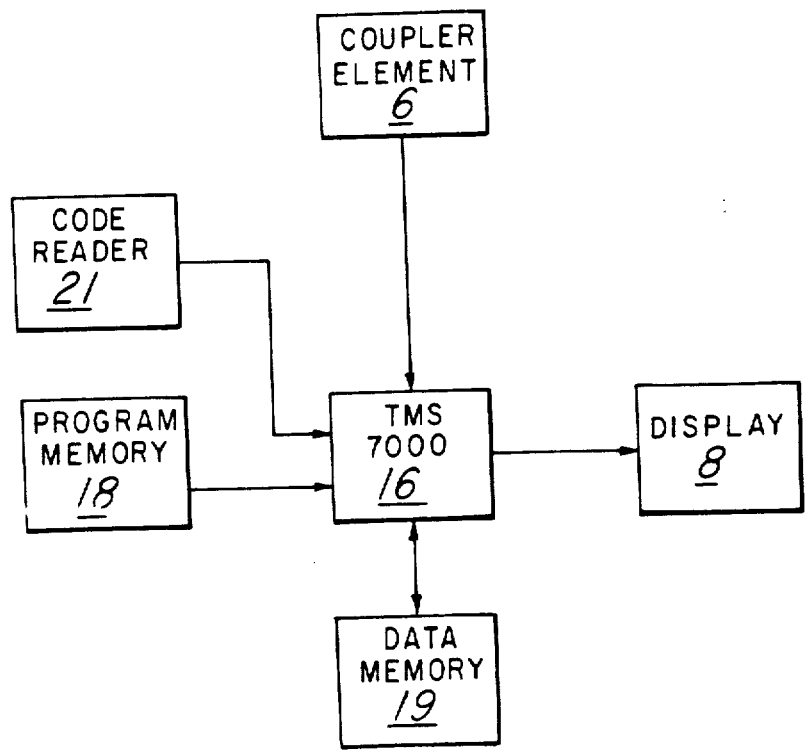

A block diagram of the electronic circuitry used in the presently preferred embodiment of the hand-held unit is shown in FIG. 4. A micro-processor (16) such as the TMS7000 manufactured by Texas Instruments Incorporated of Dallas, Tex. is used to control the data input from the coupler element (6) and to pass display data to the display (8). It should be noted that the microprocessor is not critical to the invention. Indeed, those skilled in the art may design circuitry out of discrete logic to perform similar control operations. The program memory (18) is used to store the control program for the micro-processor (16). Data memory (19) is used to store information to be provided to the individual display module (1). The data memory (19) may also be used to store an address code that is associated with the display module (1) for which data is to be provided.

The code reader (21) is of the type used to read bar codes. In alternative embodiments, this reader could be of a "feeler" type, of an optical type, or variety of other types.

How the product information display system is used will now be discussed. As shown earlier, the display module (1) is placed along a shelf near an item to be sold. Multiple display modules will commonly be used as in most cases multiple items for sale will be placed along a common shelf.

The information to be programmed into the display module by the hand-held unit would normally be obtained from a host computer system. This is done as follows. A user would take the hand-held unit to the host computer which in the preferred embodiment would also be equipped with a compatible coupler element. Alternative embodiments may require that the hand-held unit be equipped with another input port for interfacing with the host (this might be in the form of an RS232C interface). The user would then instruct the host computer to download the information and an identifier code(s) relating to the product(s), to the hand-held unit. The data is stored in the data memory (19).

At this point, the user is able to take the hand-held unit to the various display modules that need to be updated. The user takes the reader (21) and reads in the identifier for the product. As mentioned earlier, this can be either a code on the shelf location or on the item for sale (such as the UPC code). This identifier code is used by the hand-held unit to correlate what of the downloaded information is to be programmed into the display module. Next, the user brings the coupler element (6) near the coupler element (2). Communication occurs between the display module and the hand-held unit wherein the hand-held unit programs the display module to display the correct information.

An alternative embodiment that does not require as large a data memory (19) in the hand-held unit, is as follows. A host computer containing information on the products in the store has a coupler attached that is compatible with a coupler located on the hand-held unit. Communication between the host computer and the hand-held unit can occur whenever it is desired. In the preferred embodiment, this is done via an RF link. Alternatively, this can be an optical link, acoustic wave, or any other method. The user takes the reader (21) and reads the identifier for the product into the hand-held unit. As mentioned earlier, this can be either a code on the shelf location or on the item for sale (such as the UPC code). This identifier code is used by the hand-held unit to request the proper information from the host computer to be downloaded into the hand-held unit. The information is then downloaded. Next, the user brings the coupler element (6) near the coupler element (2). Communication occurs between the display module and the hand-held unit wherein the hand-held unit programs the display module to display the correct information.

The scope of the invention is not limited in any way by the examples and descriptions which have been given herein, but is meant to cover any method or apparatus or combination which comes within the scope of the claims attached hereto.

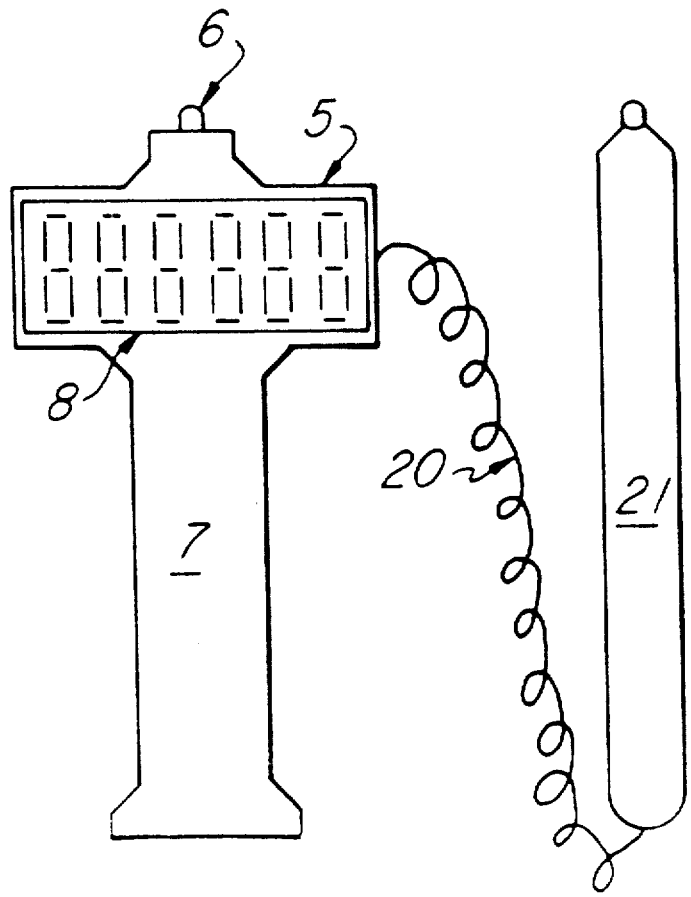

What is claimed is:

1. A product information display system comprising shelf means, product located along said shelf, indicia for uniquely identifying said product, visual display means for displaying product information, and update means for modifying said product information;

said visual display means being placed along said shelf means;

said visual display means including visual display indicia, a control means, and a first coupler means;

said control means controlling said visual display indicia in response to data received by said first coupler means;

said update means comprising a hand-held unit and reader means for reading said indicia uniquely identifying said product; and said hand-held unit further including a second coupler means for transmitting data to said first coupler means wherein said data is correlated with said indicia uniquely identifying said product.

2. The product information display system as claimed in claim 1 wherein said first control means comprises a micro-processor.

3. The product information display system as claimed in claim 1 wherein said first and second coupler means comprise optical transmission and reception devices.

4. The product information display system as claimed in claim 1 wherein said first and second coupler means comprises electro-magnetic radiation transmission and reception devices.

5. The product information display system as claimed in claim 1 wherein said visual display indicia comprises an LCD.

6. The product information display system as claimed in claim 1 wherein said visual display indicia comprises LEDs.

7. The product information display system as claimed in claim 1 wherein said first and second coupler means comprises acoustic wave transmission and reception devices.

8. A product information display system comprising: a host computer, shelf means, product located along said shelf, indicia for uniquely identifying said product, visual display means for displaying product information, and update means for modifying said product information;

said visual display means being placed along said shelf means;

said visual display means including visual display indicia, a control means, and a first coupler means;

said control means controlling said visual display indicia in response to data received by said first coupler means;

said update means comprising a hand-held unit and reader means for reading said indicia uniquely identifying said product;

said hand-held unit further including a second coupler means for transmitting data to said first coupler means, a second control means, third coupler means for communicating with said host computer, and a memory means, said host computer including a fourth coupler means for communicating with said hand-held unit via said third coupler means for the purpose of said host computer downloading data into said memory means, and said data including code representative of said indicia uniquely identifying said product and said product information, said reader means selectively generating signals representative of said indicia for uniquely identifying said product, said second control means responsive to signals from said reader means for addressing said memory means, said hand-held unit further able to selectively transmit said data addressed by said second control means to said visual display means via said second and first coupler means.

9. The product information display system as claimed in claim 8 wherein said first control means comprises a micro-processor.

10. The product information display system as claimed in claim 8 wherein said second control means comprises a micro-processor.

11. The product information display system as claimed in claim 8 wherein said first and second coupler means comprise optical transmission and reception devices.

12. The product information display system as claimed in claim 8 wherein said first and second coupler means comprise electro-magnetic radiation transmission and reception devices.

13. The product information display system as claimed in claim 8 wherein said visual display indicia comprises an LCD.

14. The product information display system as claimed in claim 8 wherein said visual display indicia comprises LEDs.

15. The product information display system as claimed in claim 8 wherein said first and second coupler means comprises acoustic wave transmission and reception devices.

* * * * *

UNITED STATES PATENT AND TRADEMARK OFFICE
CERTIFICATE OF CORRECTION

PATENT NO. : 4,654,514

DATED : Mar. 31, 1987

INVENTOR(S) : Milton R. Watson, et al.

It is certified that error appears in the above-identified patent and that said Letters Patent is hereby corrected as shown below:

The title page should be deleted to appear as per attached title page.

Drawing Sheets 1 and 2 should be deleted to be replaced with Drawing Sheets 1 and 2, consisting of Figs. 1-4, as shown on the attached pages.

This certificate supersedes Certificate of Correction issued August 4, 1987.

Signed and Sealed this

Twenty-second Day of December, 1992

Attest:

DOUGLAS B. COMER

Attesting Officer     Acting Commissioner of Patents and Trademarks

United States Patent [19]

Watson et al.

[11] Patent Number: 4,654,514
[45] Date of Patent: Mar. 31, 1987

[54] PRODUCT INFORMATION SYSTEM USING HAND-HELD UNIT WITH CODE READER

[75] Inventors: Milton R. Watson; F. G. Seeberger, Jr., both of Round Rock; Robert M. Lockerd, Dallas, all of Tex.

[73] Assignee: Texas Instruments Incorporated, Dallas, Tex.

[21] Appl. No.: 649,097

[22] Filed: Sep. 10, 1984

[51] Int. Cl.⁴ .................................. G06F 15/24
[52] U.S. Cl. ............................ 235/385; 235/383; 235/462; 235/472
[58] Field of Search ............... 235/381, 383, 385, 472; 340/825.35

[56] References Cited

U.S. PATENT DOCUMENTS

| | | | |
|---|---|---|---|
| 4,415,065 | 11/1983 | Sandstedt | 235/383 X |
| 4,423,319 | 12/1983 | Jacobsen | 235/381 X |
| 4,500,880 | 2/1985 | Gomersall et al. | 235/385 X |
| 4,521,677 | 6/1985 | Sarwin | 235/383 X |

Primary Examiner—David L. Trafton
Attorney, Agent, or Firm—James T. Comfort; Melvin Sharp; Gary C. Honeycutt

[57] ABSTRACT

Individual display modules are located along a shelf containing items for sale. The display modules are loaded via a hand-held unit with data pertaining to the items. This data has previously been downloaded from a host computer into the hand-held unit. In order to minimize human error, the hand-held unit contains a reader for reading a code from either the item or the shelf upon which the item is located. This code is then used by the hand-held unit in order to determine what data is to be downloaded into the appropriate display module. The coupling between the hand-held unit and the display modules may be of the type requiring a direct electrical connection or the close-proximity type employing optical or electro-magnetic coupling.

15 Claims, 4 Drawing Figures